Sept. 13, 1932.   J. E. MOORE   1,876,727
AUXILIARY VEHICLE WINDSHIELD
Filed May 6, 1930   2 Sheets-Sheet 1
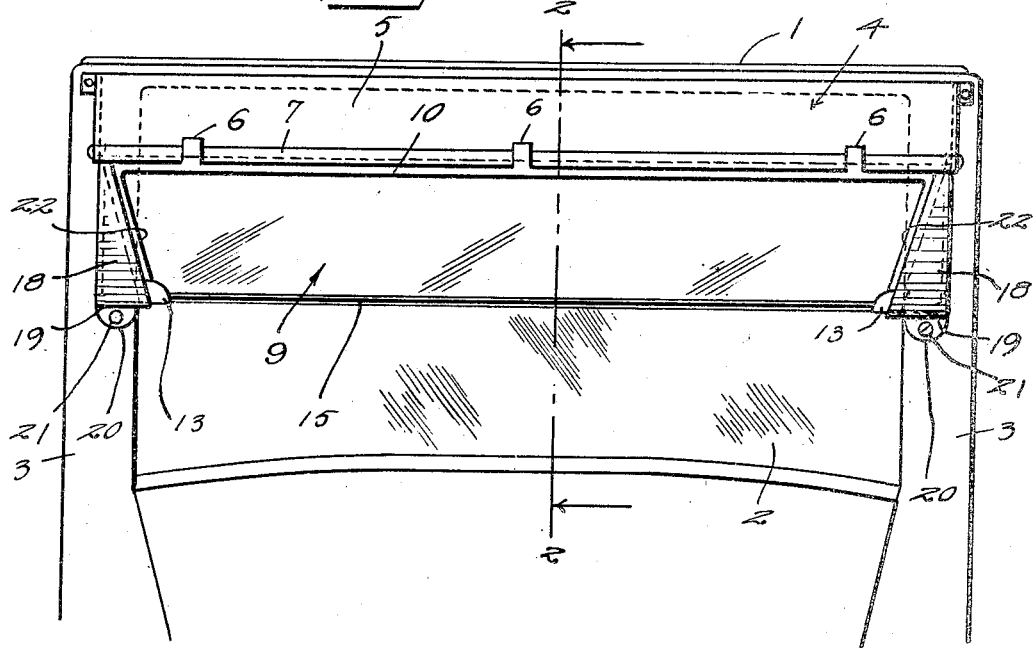
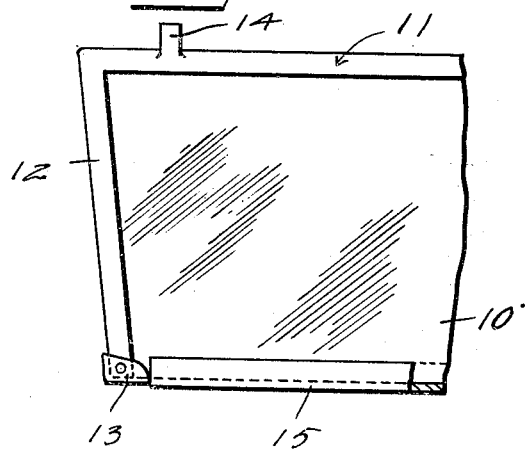
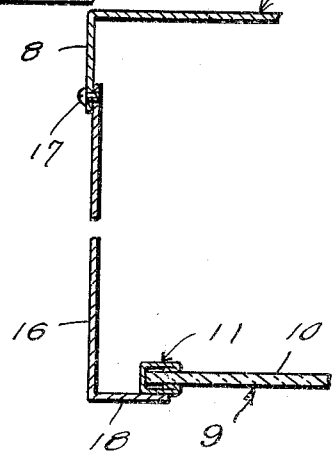
Inventor
J. E. Moore
By Watson E. Coleman
Attorney Sept. 13, 1932.  J. E. MOORE  1,876,727
AUXILIARY VEHICLE WINDSHIELD
Filed May 6, 1930  2 Sheets-Sheet 2
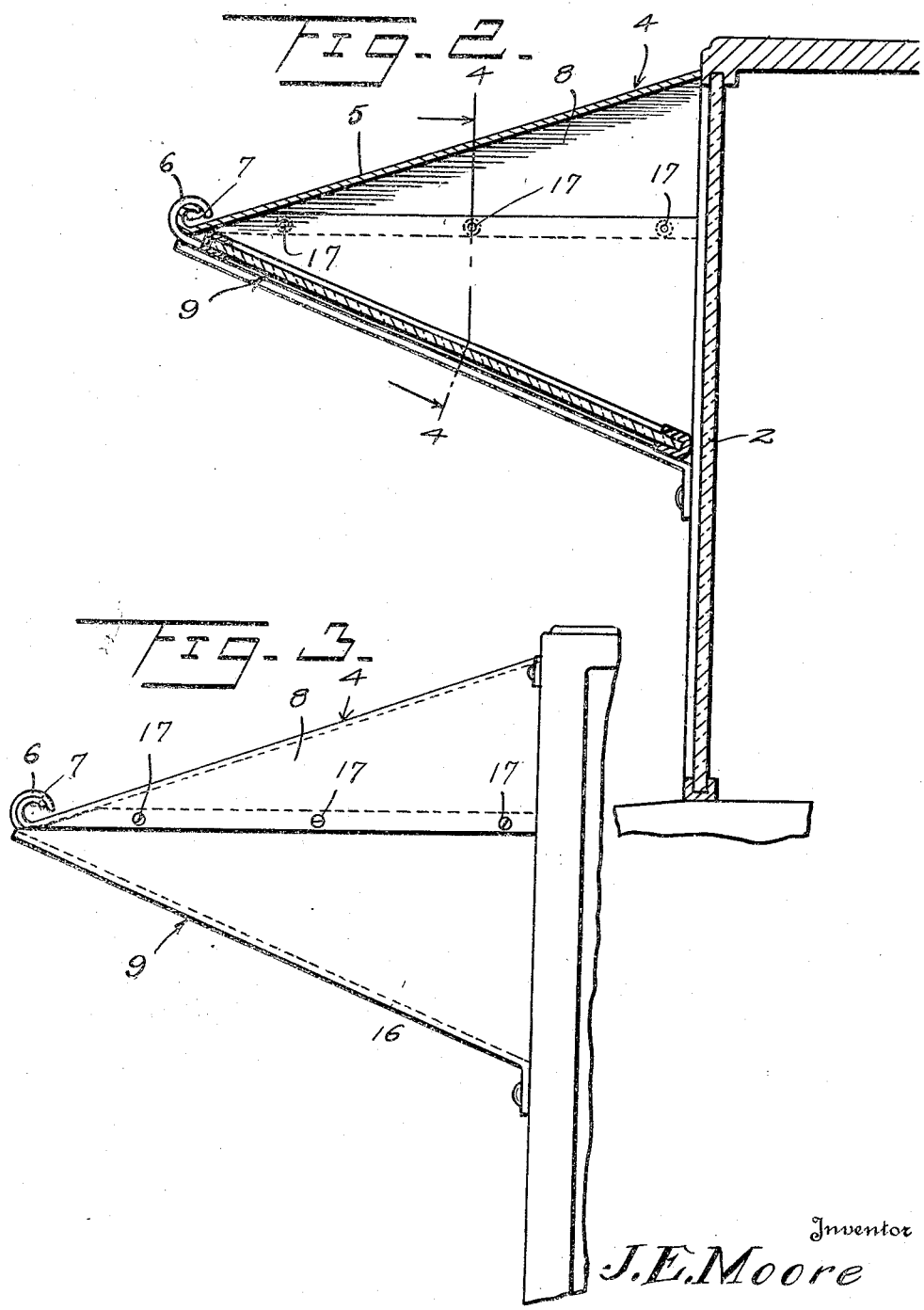

Patented Sept. 13, 1932

1,876,727

UNITED STATES PATENT OFFICE

JAMES E. MOORE, OF NILES, MICHIGAN

AUXILIARY VEHICLE WINDSHIELD

Application filed May 6, 1930. Serial No. 450,250.

This invention relates primarily to the class of motor vehicles and pertains particularly to an auxiliary windshield for use in conjunction with the regular windshield of the vehicle.

The primary object of the present invention is to provide a novel type of auxiliary windshield which will materially assist the operator of a motor vehicle in the driving of the same by causing the light rays of approaching vehicles to be deflected out of the driver's eyes when the machine is run at night and, when the machine is run during a snow or rain storm, preventing the driver's vision being obscured by removing the rain and snow from in front of the vehicle windshield through the deflection of the air currents passing thereover.

Another object of the invention is to provide a novel type of motor vehicle auxiliary windshield adapted to be mounted upon the metal visor which, at the present time, forms a permanent part of the top of every motor vehicle.

Still another object of the invention is to provide a novel means for supporting the ends of the auxiliary windshield so that the maximum field of vision is allowed.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in front elevation of the auxiliary windshield embodying the present invention showing the same applied.

Figure 2 is a sectional view taken substantially upon the line 2—2 of Figure 1.

Figure 3 is a view in end elevation of the auxiliary windshield.

Figure 4 is a sectional view taken on the line 4—4 of Figure 2.

Figure 5 is a view in elevation of one end of the auxiliary windshield removed from its supporting structure.

Referring more particularly to the drawings wherein like numerals of reference indicate corresponding parts throughout the several views, the numeral 1 indicates generally the top of a conventional type of motor vehicle showing the front thereof and the usual vertical windshield 2 therein between the upright side posts 3.

The present auxiliary windshield is designed for use in conjunction with the metal visor 4 which, at the present time, forms a permanent part of every motor vehicle. These visors consist of the top portions 5 which extend the full width of the vehicle top and project downwardly and forwardly thereof terminating at the forward edge in the turned up portion 6 which forms a gutter 7 for carrying off to the side of the vehicle rain water which falls upon the visor.

At each end the visor has a depending triangular portion 8 which has a straight lower edge that extends rearwardly to the adjacent post 3 to which it is attached.

The auxiliary windshield embodying the present invention is indicated generally by the numeral 9 and as shown comprises a glass panel 10 which has the upper or forward edge thereof of greater length than the lower edge and consequently the end edges are disposed obliquely with respect to the forward and rear edges as is clearly shown in Figure 1. A three sided frame 11 is provided which in cross-section is substantially U-shaped as shown in Figures 2 and 4 and this frame has its long side of a length to receive the long edge of the glass panel 10 and the side portions 12 angularly disposed with respect thereto to conform to the angular disposition of the end edges of the glass panel as illustrated in Figure 5. The free end of each side portion 12 of the panel frame 11 has attached thereto a metal stirrup 13 which extends over the adjacent edge of the glass panel and serves to maintain it in place in the frame. As shown in Figure 1 the shorter of the longitudinal edges of the glass panel is of a length equal to the width of the machine windshield proper which is indicated by the numeral 2 so that when the auxiliary windshield is in place the lower edge thereof will be of the same width as the windshield 2 while the upper or outer edge extends slightly at each end beyond the sides of the vehicle windshield.

Formed integral with the side portion of the frame 11 at intervals, are the suspension hooks 14 which are designed to conform to the curvature of the portion 6 of the visor so that they may be hooked thereover and firmly maintain the forward or outer edge of the auxiliary windshield in place when the inner edge thereof, which carries a rubber guard strip 15, is swung in for contact with the vehicle windshield in the manner shown in Figures 1 and 2.

At each end of the auxiliary windshield structure is a substantially triangular metal plate 16, one straight edge of which, when in position, abuts the forward face of the adjacent body post 3 while the other or right angularly disposed edge projects upwardly into the visor 4 overlapping the lower edge of the adjacent panel 8 thereof to which it is secured in any suitable manner, as for example by the use of the bolts 17.

Formed along the lower inclined edge of each triangular end plate 16 is an inwardly projecting flange 18 which is also of triangular configuration, the base edge 19 thereof abutting the face of the adjacent post 3 and carrying an apertured ear 20 through which a securing screw 21 is passed into the adjacent post to maintain the flange 18 in place. The edge 22 forming the hypotenuse of the triangular plate 18 underlies the adjacent end of the panel 10 and the portion of the frame 11 which receives it, this edge tapering off toward the forward edge of the auxiliary windshield panel in a line parallel with the adjacent edge of the panel as shown in Figure 1.

Any suitable form of noise deadening material may be inserted between the triangular supporting flanges 18 and the adjacent glass panel frame 11 to prevent noises and also to prevent the passage of air between the frame and the supporting portion of the end plate.

From the foregoing description it will be readily seen that when a device of the character herein described is in position upon a motor vehicle the air currents striking the lower portion of the windshield 10 will be deflected so as to sweep rearwardly and downwardly over the inclined face of the auxiliary windshield and thus sweep from the surface thereof any snow or raindrops which may have been driven thereagainst thus giving the driver of the vehicle a clear view at all times of the road ahead of his machine. In addition to this the angular inclination of the panel 10 will, to a certain extent, so alter the direction of travel of light rays falling thereon from the headlights of approaching vehicles as to divert them from the eyes of the driver of the vehicle to which the present device is attached and thus prevent these rays from blinding the driver.

Having thus described my invention, what I claim is:—

1. The combination with a vehicle windshield having a forwardly and downwardly projecting visor across the upper portion thereof, of an auxiliary windshield, comprising a glass panel of a width substantially equal to the width of the vehicle windshield, elements carried by the panel along one longitudinal edge for detachably securing the panel to the forward edge of said visor, a substantially triangular plate at each end of the glass panel closing the area between the panel and the vehicle windshield, and a supporting flange carried by each triangular plate and underlying the adjacent edge of the glass panel to maintain the same in downwardly and inwardly inclined position with respect to the vehicle windshield.

2. The combination with a vehicle windshield having a forwardly and downwardly projecting visor across the upper portion thereof, of an auxiliary windshield, comprising a glass panel of a width substantially equal to the width of the vehicle windshield, elements carried by the panel along one longitudinal edge for detachably securing the panel to the forward edge of said visor, a substantially triangular plate at each end of the glass panel closing the area between the panel and the vehicle windshield, and a supporting flange carried by each triangular plate and underlying the adjacent edge of the glass panel to maintain the same in downwardly and inwardly inclined position with respect to the vehicle windshield, said panel being of greater width at its forward or outer edge than at the inner edge thus disposing the end edges at oblique angles with respect to the longitudinal side edges, and said triangular panel flanges being of substantially triangular outline to conform at their inner edges with the angular disposition of the adjacent panel edges.

3. The combination with a vehicle windshield having a visor across the upper portion thereof and closed at each end, of a glass panel having one longitudinal edge of greater length than the other, the length of the edge of lesser length being substantially equal to the width of the vehicle windshield, a frame engaging the edge of greater length of the panel and each end edge thereof, hook members formed along the longer edge of said frame and adapted to engage the forward edge of said visor, a triangular plate formed to close the area between said panel and the adjacent vehicle windshield and the closed ends of said visor, a substantially triangular flange projecting inwardly from each triangular panel to underlie and support the adjacent edge of the glass panel, and a securing ear formed at the lower edge of each triangular flange for attachment to the adjacent vehicle windshield structure.

4. The combination with a vehicle windshield having a forwardly and downwardly inclined visor over the upper portion thereof and having posts at the sides thereof; of an auxiliary windshield comprising a glass panel, a frame carrying the panel, hook members formed integral with said frame along one longitudinal side and adapted to detachably engage over the forward edge of the visor, and a plate member at each end and disposed against the outer face of the auxiliary windshield and lying parallel therewith and having connection with said visor and further having an apertured ear adapted to be positioned against the adjacent windshield post to be secured thereto to maintain the auxiliary windshield with the longitudinal side opposite said hooks against the face of the vehicle windshield.

In testimony whereof I hereunto affix my signature.

JAMES E. MOORE.